(12) United States Patent
Ghadyani

(10) Patent No.: US 10,753,835 B2
(45) Date of Patent: Aug. 25, 2020

(54) APPARATUS AND METHOD FOR SAMPLING FLUIDS WITHOUT VOLUME LIMITATION

(71) Applicant: Mohammad Ghadyani, Tehran (IR)

(72) Inventor: Mohammad Ghadyani, Tehran (IR)

( * ) Notice: Subject to any disclaimer, the term of this patent is extended or adjusted under 35 U.S.C. 154(b) by 99 days.

(21) Appl. No.: 16/124,190

(22) Filed: Sep. 7, 2018

(65) Prior Publication Data

US 2019/0107468 A1 Apr. 11, 2019

(51) Int. Cl.
  *G01N 1/00* (2006.01)
  *G01N 1/28* (2006.01)
  *B02C 19/08* (2006.01)

(52) U.S. Cl.
  CPC ............. *G01N 1/286* (2013.01); *B02C 19/08* (2013.01); *G01N 2001/2866* (2013.01)

(58) Field of Classification Search
  CPC ............ G01N 1/286; G01N 2001/2866; B02C 19/08; B02C 1/12; B02C 1/005
  USPC ....................................................... 73/863.02
  See application file for complete search history.

(56) References Cited

U.S. PATENT DOCUMENTS

| | | | |
|---|---|---|---|
| 3,771,366 A | 11/1973 | Thulin | |
| 4,204,430 A | 5/1980 | Tamm et al. | |
| 5,337,822 A | 8/1994 | Massie et al. | |
| 6,189,392 B1 * | 2/2001 | Schultz | E21B 49/081 73/864 |
| 7,393,694 B1 * | 7/2008 | Schlein | G01N 1/02 422/547 |
| 2013/0280143 A1 | 10/2013 | Zucchelli et al. | |
| 2016/0114317 A1 | 4/2016 | Ennis | |
| 2016/0367913 A1 * | 12/2016 | Ghadyani | B67C 11/06 |
| 2019/0120732 A1 * | 4/2019 | Ghadyani | G01N 1/14 |

* cited by examiner

*Primary Examiner* — Jamel E Williams
(74) *Attorney, Agent, or Firm* — NovoTechIP International PLLC

(57) ABSTRACT

An improved apparatus and method for sampling fluids without volume limitation comprises, in one implementation, a holder unit, a pumping unit, and a control unit. The pumping unit includes an inlet channel, an outlet channel, a pumping motor, and a circulation hose in which the pumping motor is configured to circulate a fluid specimen from the inlet channel to the outlet channel into the circulation hose. The circulation hose is attached to the outlet channel, and secured to the holder unit displaced from a user to prevent direct contact with the fluid specimen during sampling when dealing with a hazardous specimen. The control unit includes a switch, a regulating module, and an electronic board, and is configured to regulate circulation of the fluid specimen through the pumping unit. The switch is configured to START/END the sampling process and to send signals to the electronic board to stay ON/OFF during sampling, and the regulating module is configured to adjust voltage of the pumping motor consistent with viscosity of the fluid specimen to allow circulation without volume limitation.

15 Claims, 5 Drawing Sheets

APPARATUS AND METHOD FOR SAMPLING FLUIDS WITHOUT VOLUME LIMITATION

CROSS REFERENCE TO RELATED APPLICATION

This application claims the benefit of priority to Iran Application Serial Number 139650140003007007, filed on Sep. 7, 2017, the entire content of which is incorporated herein by reference.

TECHNICAL FIELD

The present disclosure relates generally to sampling fluids and, more particularly, to sampling fluids without imposing volume limitation on an amount of a fluid specimen.

BACKGROUND

Within different branches of industry there is a constantly growing need for automatic sampling at given interval of time, especially within process engineering. High reliability, great accuracy, minimal carry-over of sample residue from one sample to the next, and long life are among essential requirements in automatic sampling. Furthermore, it is necessary to be able to collect samples, not only in large, but especially in small and very small quantities of fluid with high accuracy of measurement and with reliable reproducibility.

Most commercially available automatic sampling devices are designed to operate based on a predetermined volume for collecting a fluid specimen. Many of these devices utilize a capillary channel to collect a predetermined volume of fluid specimen. The capillary channel of typical devices and systems, however, has difficulty collecting sample volumes which exceed a predetermined amount, and cannot handle variable volumes. Moreover, these drawbacks inherent in the conventional setup make it even more difficult to perform sampling at large scale with high viscosity. As such, the application of these devices is limited to a specific industry, such as medical laboratory where a small amount of fluid specimen with moderate viscosity is required for sampling. Furthermore, almost all errors in sampling process are associated with human or pre-analytical processing errors where preparation and adjusting sampling by hand permit upfront human error to occur at various sample collection sites and laboratories. As a result, the entire process can lead to increase in sampling time and labor intensity, and thus cost inefficiency.

With all these shortcomings, there remains a need to develop an improved fluid sampling device that provides an easier and more efficient means for collecting fluid specimen of all kinds and all measures without being limited to a specific and predetermined volume while maintaining satisfactory accuracy and safety as well as being timely and cost effective.

Accordingly, the present disclosure addresses providing an improved apparatus and method for sampling fluids without volume limitation, while offering a safe and reliable sampling process in a timely and cost-effective fashion.

SUMMARY

In one general aspect, the instant application describes an improved apparatus for sampling fluids without imposing volume limitation on an amount of a fluid specimen. In one implementation, the apparatus for sampling fluids without volume limitation may include a holder unit, a pumping unit, and a control unit. The holder unit may include a top and a bottom end, and can be configured to provide structural support to the pumping unit and the control unit. The pumping unit may be connected to the bottom end of the holder unit, and can be configured to circulate the fluid specimen. The control unit may be in contact with the pumping unit and may be secured to the holder unit, and can be configured to regulate circulation of the fluid specimen.

In an aspect, the holder unit may include a grip handle, a base channel, a side channel, and a supporting rod. The base channel may be attached to the grip handle from a first end and to the side channel from a second end. The side channel may extend between the top and bottom ends of the holder unit, and can be connected to the supporting rod from a top end. The base channel may be arranged to rotate around the side channel to allow the grip handle to be positioned at different distances from the pumping unit when needed. The grip handle may be arranged to be distant from the pumping unit to prevent direct contact between a user and the fluid specimen during sampling when dealing with a hazardous specimen.

In a related aspect, the pumping unit may include an inlet channel, an outlet channel, a pumping motor, and a circulation hose. The pumping motor can be configured to circulate the fluid specimen from the inlet channel to the outlet channel into the circulation hose in which the circulation hose may be attached to the outlet channel and secured to the holder unit. The circulation hose may be arranged to transfer the fluid specimen from an input sampling container into an output sampling container where the inlet channel can be in contact with the input sampling container, and the circulation hose can be in contact with the output sampling container. The circulation hose may be attached to the outlet channel from a first end and secured to the supporting rod from a second end.

In a further aspect, the control unit may include a switch, a regulating module, and an electronic board. The control unit can be connected to the base channel, and can be configured to regulate circulation of the fluid specimen through the pumping unit. The regulating module may be configured to adjust voltage of the pumping motor consistent with viscosity of the fluid specimen to allow circulation without volume limitation. The switch may include an ON and an OFF key, and can be connected to START and END circulation of the fluid specimen. The electronic board may include a light source that can be controlled to stay on so as to keep a user alerted while collecting the sample specimen to avoid human errors and to add procedural safety during sampling.

In another general aspect, described is an improved method of sampling fluids without volume limitation. In one implementation, the method of sampling fluids without volume limitation may include the steps of calibrating a regulating module based on a base voltage of a pumping motor in which the regulating module may be in contact with the pumping motor, and can be secured to a base channel, and the base channel may be connected to a grip handle from a first end and to a side channel from a second end.

In an aspect, the method of sampling fluids without volume limitation may include grading a timer of the regulating module from the prior calibration. The method of sampling fluids without volume limitation may also include adjusting the timer to a desired volume of the fluid specimen for circulation.

In a related aspect, the method of sampling fluids without volume limitation may include pumping the fluid specimen with the pumping motor by turning on a switch where the pumping motor can be configured to circulate the fluid specimen from an inlet channel to an outlet channel into a circulation hose in which the inlet and outlet channels may be connected to the pumping motor, and the circulation hose may be connected to the outlet channel from a first end and secured to a supporting rod from a second end.

In a further aspect, the method of sampling fluids without volume limitation may include controlling circulation of the fluid specimen by turning ON/OFF the switch where the switch may be in contact with the regulating module and the pumping motor, and can be secured to the base channel. The method of sampling fluids without volume limitation may further include pumping distilled water to clean the inlet channel, the outlet channel, and the circulation hose after each sampling use to prevent chemical reactions with the fluid specimen.

The foregoing and other objects, features, aspects, and advantages of the present invention will become more apparent from the following detailed description of the present application when taken in conjunction with the accompanying drawings.

BRIEF DESCRIPTION OF THE DRAWINGS

Features of the subject technology are set forth in the appended claims. However, for purpose of explanation, several implementations of the subject technology are set forth in the following figures.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings. As part of the description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

Figure 1:
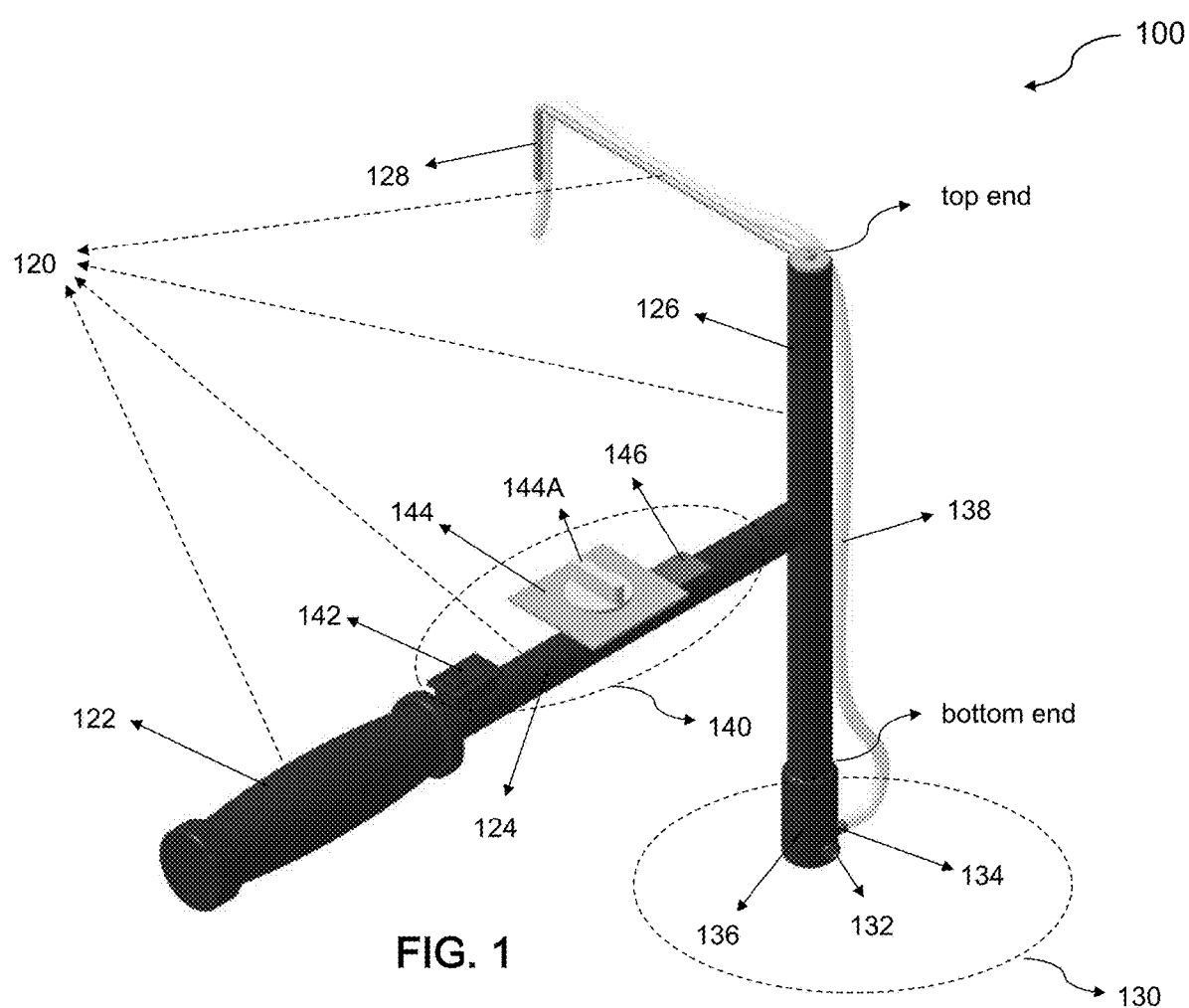
FIG. 1. is an exemplary perspective view of an improved fluid sampling device for providing an improved method of sampling without volume limitation, in accordance with one or more implementations.

A solution is proposed herein to resolve the above-motioned issues and others by providing an improved apparatus and method of sampling fluid without volume limitation. Principles of the present invention will now be described in detail with reference to the examples illustrated in the accompanying drawings and discussed below. To safely collect and dispense sample fluids at high precision and fast speed, an improved sampling machine and process, in accordance with aspects of the invention, is described herein. FIG. 1 is a perspective view of the improved apparatus and method for sampling fluid that can be configured to collect and dispense a fluid specimen 110 with no constraint in volume. In this exemplary embodiment, the improved fluid sampling machine 100 (hereinafter "system 100") may include a holder unit 120, a pumping unit 130, and a control unit 140. In one implementation, the holder unit 120 as shown may include a top and a bottom end, and can be configured to provide structural support to the pumping unit 130 and the control unit 140. The pumping unit 130 may be connected to the bottom end of the holder unit 120, and can be configured to circulate the fluid specimen 110. The control unit 140 may be in contact with the pumping unit 130 and may be secured to the holder unit 120, and can be configured to regulate circulation of the fluid specimen 110.

In one implementation, the holder unit 120 may include a grip handle 122, a base channel 124, a side channel 126, and a supporting rod 128. The base channel 124 may be attached to the grip handle 122 from a first end and to the side channel 126 from a second end. The side channel 126 may extend between the top and bottom ends of the holder unit 120, and can be connected to the supporting rod 128 from a top end. In an aspect, the base channel 124 may be arranged to rotate around the side channel 126 to allow the grip handle 122 to be positioned at different distances from the pumping unit 130 when needed. In a related aspect, the grip handle 122 may be arranged to be distant from the pumping unit 130 to prevent direct contact between a user and the fluid specimen 110 during sampling when dealing with a hazardous specimen.

In one implementation, the pumping unit 130 may include an inlet channel 132, an outlet channel 134, a pumping motor 136, and a circulation hose 138. The pumping motor 136 can be configured to pump the fluid specimen 110 from the inlet channel 132 to the outlet channel 134 into the circulation hose 138 in which the circulation hose 138 may be attached to the outlet channel 134 and secured to the holder unit 120. In an aspect, the pumping motor 136 may include an electric motor, and can be made of materials resistant to corrosion and high temperature to control chemical reaction of the motor with the fluid specimen 110. Distilled water may be pumped into the pumping unit 130 to clean the inlet channel 132, the outlet channel 134, and the circulation hose 138 after each sampling to prevent chemical reactions with the fluid specimen 110.

In one implementation, the circulation hose 138 may be arranged to transfer the fluid specimen 110 from an input sampling container into an output sampling container in which the inlet channel 132 can be in contact with the input sampling container, and the circulation hose 138 can be in contact with the output sampling container. The circulation hose 138 may be attached to the outlet channel 134 from a first end and secured to the supporting rod 128 from a second end. In an aspect, the input sampling container may be arranged to include the fluid specimen 110 to at least, e.g., 3 cm of depth for sampling to proceed. In a related aspect, the fluid specimen 110 can be collected from different input sampling containers, such as a fluid storage tank and a natural reservoir.

In one implementation, the control unit 140 may include a switch 142, a regulating module 144, and an electronic board 146. The control unit 140 can be connected to the base channel 124, and can be configured to regulate circulation of the fluid specimen 110 through the pumping unit 130. In an aspect, the control unit 140 may be in contact with the pumping unit 130 through electrical wires to send regulating signals.

In one implementation, the regulating module 144 may include a timer 144A, and can be configured to operate based on a desired amount of the fluid specimen 110. The timer 144A may be adjusted based on a conversion between time and volume, according to the following equation, to show the desired amount of the fluid specimen 110 in volume.

$$\Delta t = \frac{\Delta V}{Q} \quad (1)$$

In equation (1), $\Delta t$ represents time flow of the fluid specimen 110, $\Delta V$ indicates volume of the fluid specimen 110 at a given time, and Q is flowmeter of the fluid specimen 110 in unit of volume. In an aspect, the timer 144A can be of different types, such as a mechanical and a digital timer.

In one implementation, the regulating module 144 can be configured to adjust voltage of the pumping motor 136 consistent with viscosity of the fluid specimen 110. Calibration of the regulating module 144 can be performed once prior to sampling to determine a base voltage for the pumping motor 136. The base voltage may be obtained to avoid changing calibration of the regulating module 144 for different fluid specimens with different viscosities.

In one implementation, the switch 142 of the control unit 140 may include an ON and an OFF key, and can be configured to START and END circulation of the fluid specimen 110. The switch 142 may be arranged to equip a user to control and immediately stop circulation of the fluid specimen 110 in an emergency situation. The electronic board 146 may include a light source, that can be controlled to stay on and thereby keep a user alerted while collecting the sample specimen 110 to avoid upfront human errors and to add procedural safety during sampling.

Figure 2A:
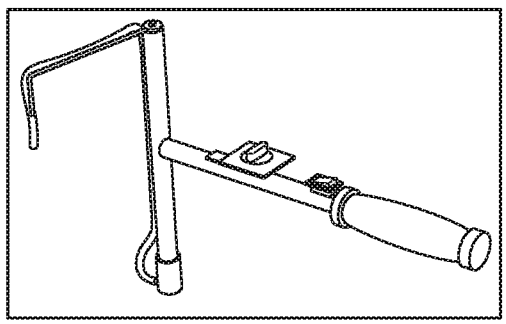
FIG. 2A, FIG. 2B and FIG. 2C show the improved fluid sampling device viewed from different spatial perspectives.
Figure 2B:
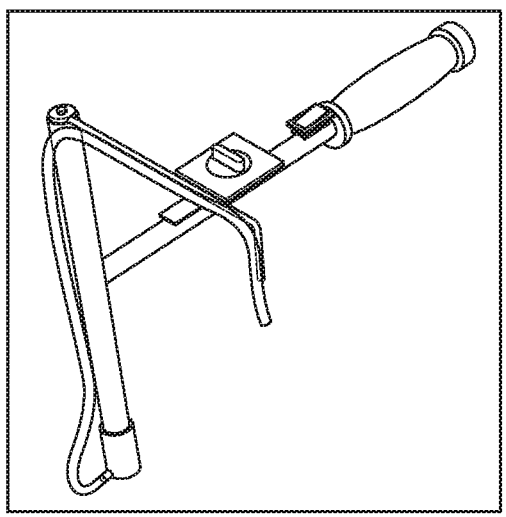
Figure 2C:
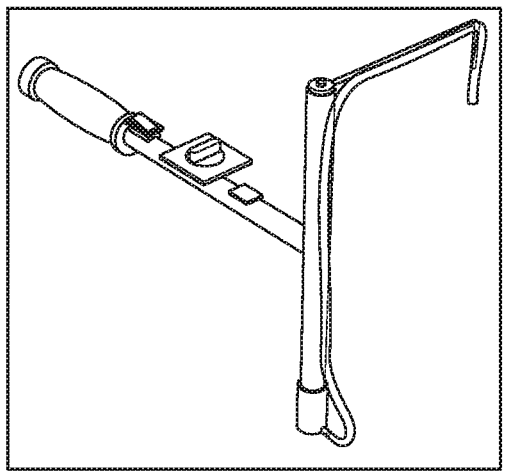

FIG. 2A through FIG. 2C show the system 100 viewed from different spatial perspectives.

Figure 3:
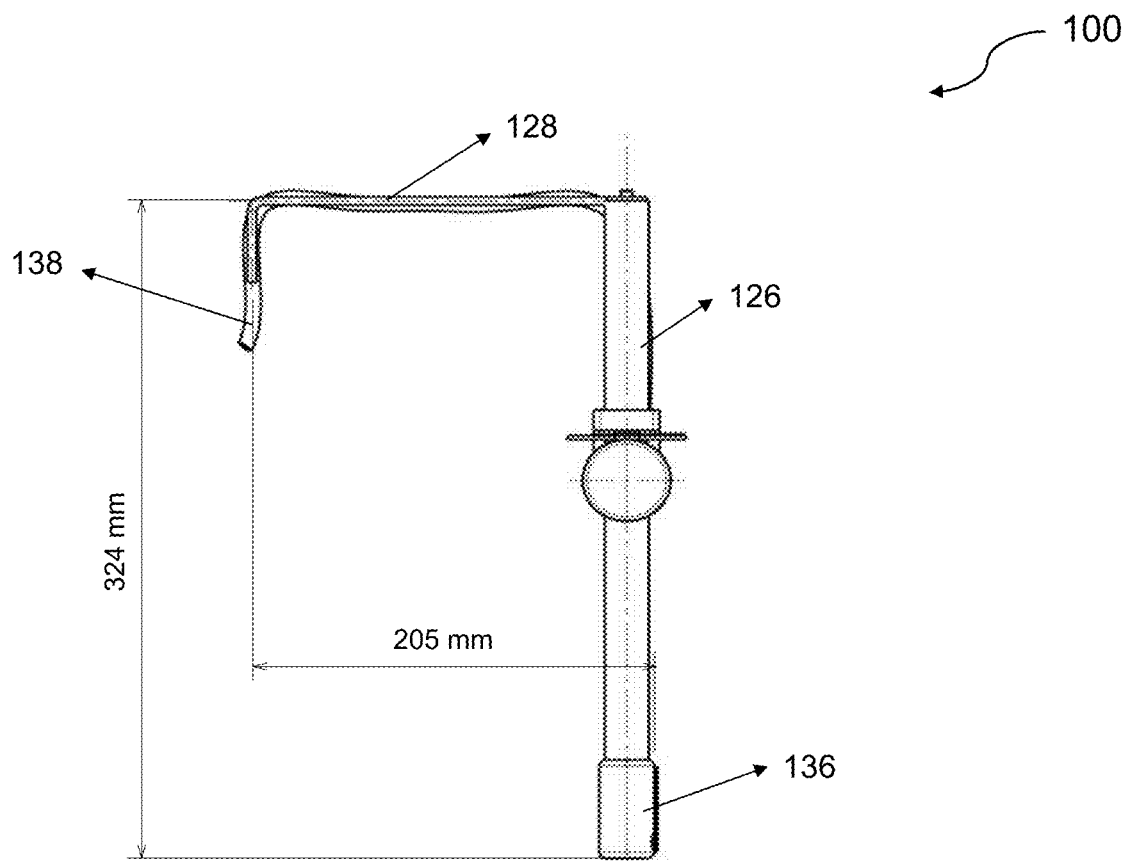
FIG. 3 shows another side view of the improved fluid sampling device.

FIG. 3 is a side view of the system 100, showing the side channel 126 and the supporting rod 128 of the holder unit 120; and the pumping motor 136 and the circulation hose 138 of the pumping unit 130. As one example, specific dimensions for the arrangement of these components of the system 100 from the side view are shown in FIG. 3.

Figure 4:
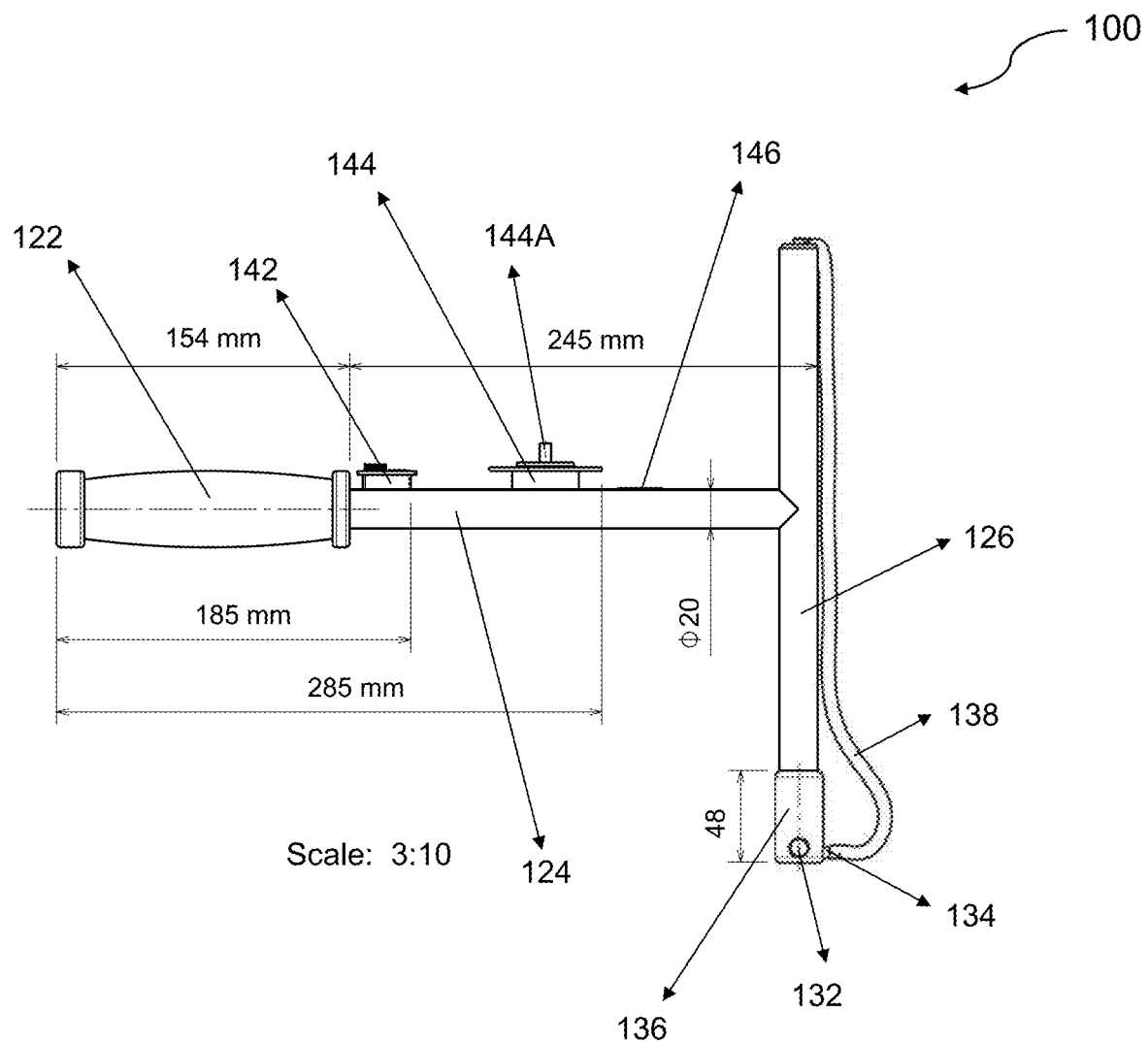
FIG. 4 shows the improved fluid sampling device viewed from another side perspective.

FIG. 4 is another side view of the system 100. Depicted are the grip handle 122, the base channel 124 and the side channel 126 of the holder unit 120; the inlet channel 132, the outlet channel 134, the pumping motor 136 and the circulation hose 138 of the pumping unit 130; and the switch 142, the regulating module 144, the timer 144A and the electronic board 146 of the control unit 140. As one example, specific dimensions for the arrangement of these components of the system 100 from the side view are shown in FIG. 4.

Figure 5A:
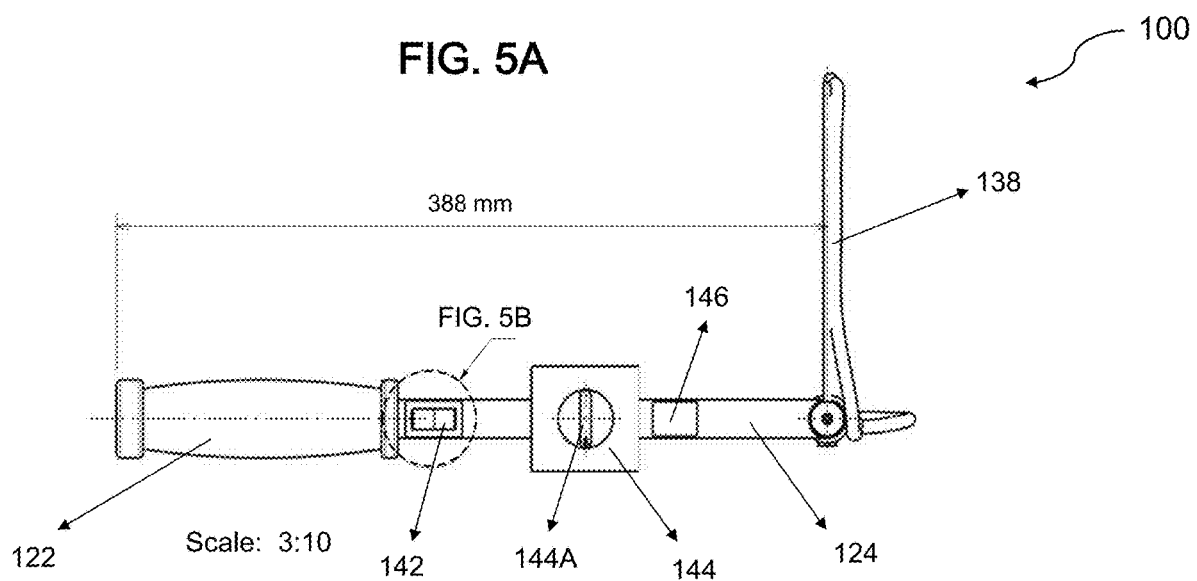
FIG. 5A and FIG. 5B show the improved fluid sampling device viewed from a top perspective.
Figure 5B:
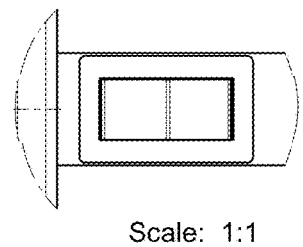

FIG. 5 is a top view of the system 100, showing the grip handle 122 and the base channel 124 of the holder unit 120; the circulation hose 138 of the pumping unit 130; and the switch 142, the regulating module 144, the timer 144A and the electronic board 146 of the control unit 140. As one example, specific dimensions for the arrangement of these components of the system 100 from the top view are shown in FIG. 5.

Accordingly, the improved apparatus and method for fluid sampling device in the present invention can provide an efficient mechanism to circulate the fluid specimen in consistent with viscosity and without volume limitation. Also, the fluid sampling device can provide an efficient mechanism to safely collect chemical and biological fluid specimen as well as to safely dispense the collected specimen in a simple, timely and cost-effective fashion. Moreover, the fluid sampling process may be arranged with a precision of, e.g., 0.5 ml to avoid procedural errors, such as human errors. As a result of the discussed advantages, the fluid sampling device described herein, may be not limited to a specific setting, and can be used in a variety of fields, such as a chemical/medical laboratory as well as an industrial setting.

The separation of various components in the examples described above should not be understood as requiring such separation in all examples, and it should be understood that the described components and systems can generally be integrated together in a single packaged into multiple systems.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

What is claimed is:

1. An apparatus for sampling a fluid specimen without volume limitation, comprising:
    a holder unit having a top end and a bottom end;
    a pumping unit connected to the bottom end of the holder unit, and configured to circulate the fluid specimen; and
    a control unit in contact with the pumping unit and secured to the holder unit, and configured to regulate circulation of the fluid specimen;
    wherein:
    the holder unit includes a grip handle, a base channel, a side channel, and a supporting rod, and the base channel is attached to the grip handle from a first end and to the side channel from a second end, and the side channel extends between the top and bottom ends of the holder unit, and is connected to the supporting rod from a top end,
    the pumping unit includes an inlet channel, an outlet channel, a pumping motor, and a circulation hose, and the pumping motor is configured to pump the fluid specimen from the inlet channel to the outlet channel into the circulation hose, and the circulation hose is attached to the outlet channel and secured to the holder unit, and
    the control unit includes a switch and a regulating module connected to the base channel and configured to regulate circulation of the fluid specimen through the pumping unit with flexibility to sampling volume.

2. The apparatus of claim 1, wherein the circulation hose is arranged to transfer the fluid specimen from an input sampling container into an output sampling container in which:
    the inlet channel is in contact with the input sampling container, and
    the circulation hose is in contact with the output sampling container, and is attached to the outlet channel from a first end and secured to the supporting rod from a second end.

3. The apparatus of claim 2, wherein the input sampling container is arranged to include the fluid specimen to at least 3 cm of depth for sampling to proceed.

4. The apparatus of claim 1, wherein the pumping motor includes an electric motor, and is resistant to corrosion and high temperature to control chemical reaction of the motor with the fluid specimen.

5. The apparatus of claim 1, wherein the control unit is in contact with the pumping unit to send regulating signals thereto.

6. The apparatus of claim 1, wherein the regulating module includes a timer, and is configured to operate based on a desired amount of the fluid specimen.

7. The apparatus of claim 6, wherein the timer is of a type selected from the group consisting of a mechanical timer and a digital timer.

8. The apparatus of claim 6, wherein the timer is adjusted based on a conversion between time and volume to show the desired amount of the fluid specimen in volume.

9. The apparatus of claim 6, wherein the regulating module is configured to adjust voltage of the pumping motor consistent with viscosity of the fluid specimen.

10. The apparatus of claim 1, wherein the switch includes an ON and an OFF key, and is connected to START and END circulation of the fluid specimen.

11. The apparatus of claim 1, including an electronic board that includes a light source controlled to stay on so as to keep a user alerted while collecting the sample specimen to avoid human errors and to add procedural safety during sampling.

12. The apparatus of claim 1, wherein the base channel is arranged to rotate around the side channel to allow the grip handle to be positioned at different distances from the pumping unit when needed.

13. The apparatus of claim 12, wherein the grip handle is arranged to be distant from the pumping unit to prevent direct contact between a user and the fluid specimen during sampling when dealing with a hazardous specimen.

14. A method of sampling a fluid specimen without volume limitation comprising:
    calibrating a regulating module based on a base voltage of a pumping motor, the regulating module being in contact with the pumping motor, and being secured to a base channel, the base channel being connected to a grip handle from a first end and to a side channel from a second end;
    scaling a timer of the regulating module from the prior calibration;
    adjusting the timer to a desired volume of the fluid specimen for circulation;
    pumping the fluid specimen with the pumping motor by turning on a switch, the pumping motor being configured to circulate the fluid specimen from an inlet channel to an outlet channel into a circulation hose, the inlet and outlet channels being connected to the pumping motor, the circulation hose being connected to the outlet channel from a first end and secured to a supporting rod from a second end;
    controlling circulation of the fluid specimen by turning ON/OFF the switch, the switch being in contact with the regulating module and the pumping motor, and being secured to the base channel; and
    pumping distilled water to clean the inlet channel, the outlet channel, and the circulation hose after each sampling use to prevent chemical reactions with the fluid specimen.

15. The method of sampling a fluid specimen of claim 14, wherein the sampling is arranged with a precision of 0.5 ml to avoid procedural errors including human errors.

\* \* \* \* \*